March 22, 1966  H. B. OSBORN, JR  3,242,300
METHOD AND APPARATUS FOR WELDING METAL TUBING
Filed Oct. 28, 1963
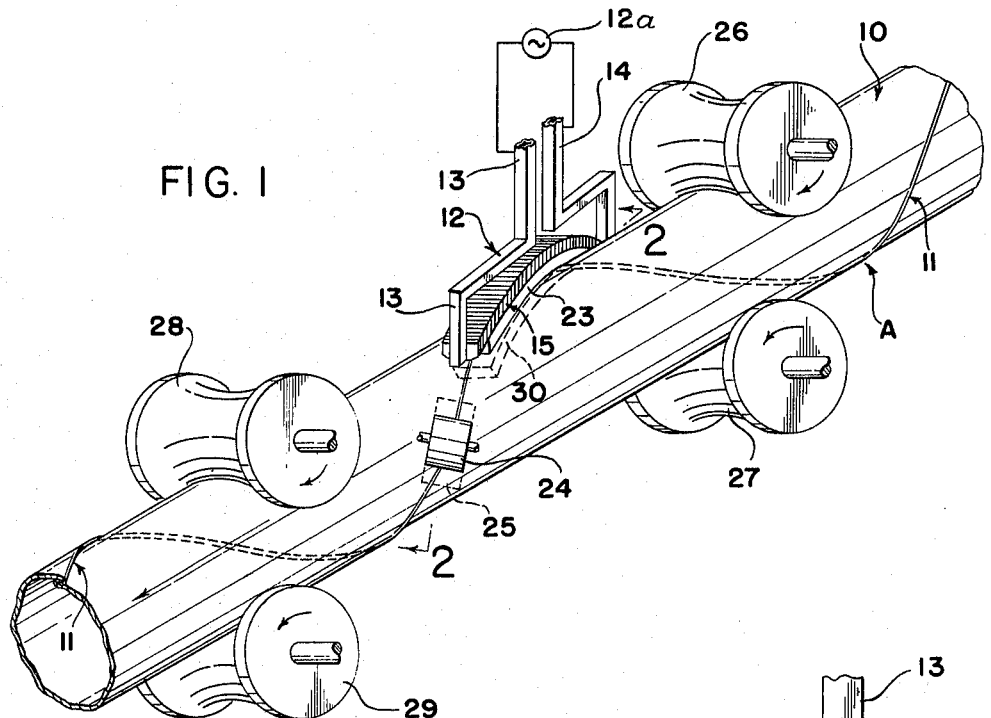
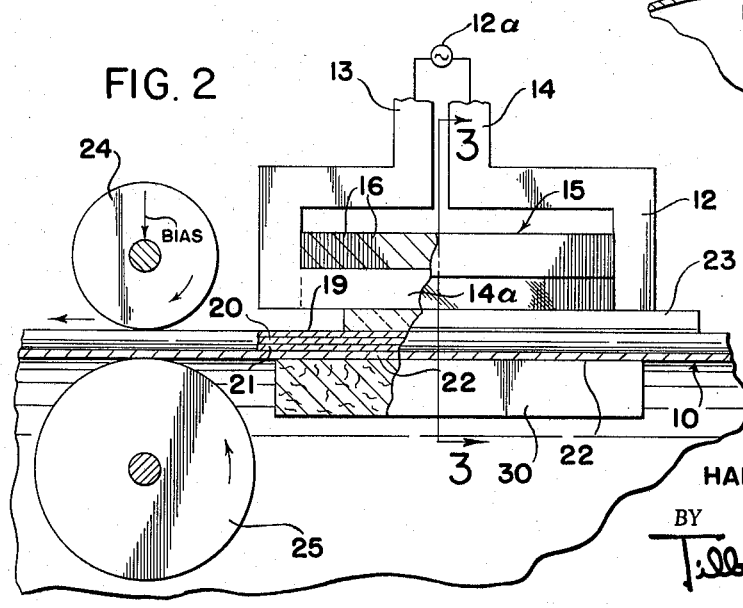
INVENTOR.
HARRY B. OSBORN, JR.
BY Tillberry & Body
ATTORNEYS

United States Patent Office 3,242,300
Patented Mar. 22, 1966

3,242,300
METHOD AND APPARATUS FOR WELDING METAL TUBING
Harry B. Osborn, Jr., University Heights, Ohio, assignor to The Ohio Crankshaft Company, Cleveland, Ohio, a corporation of Ohio
Filed Oct. 28, 1963, Ser. No. 319,369
4 Claims. (Cl. 219—8.5)

The present invention relates to the art of welding and, more particularly, to continuous welding the edges of a spirally formed tubing.

The present invention is particularly adapted for welding spirally wound, thin walled metal tubing and it will be discussed with particular reference thereto; however, the invention has somewhat broader applications and it may be used in welding other spiral tubing.

It has been proposed to form welded joints in spirally formed metal tubing and the like by arc welding the abutting edges of the tubing. In these arc welding methods the edges of the tubing are butted and then progressively welded by a shielded arc. Sometimes the seam was lap welded instead of butt welded, however, in both cases, the rate of welding was prohibitively reduced to obtain a sound weld. To increase the welding rate without reducing the quality of the welded seam it has been proposed to form an interlocking or folded seam and weld the seam by a shield arc. This method has proven equally unsuccessful.

The shielded arc welding methods of forming spiral tubing are inherently slow. Also, the quality of the welded joint produced by arc welding, especially in the case of interlocked seam, is not uniform or water-tight.

In an attempt to overcome the speed limitations which are inherent in arc welding, the art has been directed to high frequency induction welding methods.

High frequency induction welding has not proven satisfactory when interlocking seams are used in the spiral pipe because the seam includes a number of layers of metal. Thus, the upper layer is overhead while the lower layer is underheated. In addition, when high frequency current is used, there is a tendency for the heat to be concentrated at the surfaces of the respective layers although it is known that a properly welded joint cannot be achieved unless heating occurs to a suitable depth throughout the thickness of each layer. These problems have discouraged high-frequency induction welding usage in spite of the inherent higher welding speeds of such a method.

The present invention contemplates the overcoming of these problems by means of induction heating wherein the frequency of the current produces magnetic flux lines which penetrate all layers of the interlocking seam such that all of the layers are uniformly heated to a proper welding temperature.

In accordance with the present invention, there is provided a high frequency induction heating apparatus and method for welding the continuous interlocking seams of spirally wound metal tubing wherein magnetic flux lines created by the alternating frequency heating current penetrate all of the superimposed layers in the interlocking seam and provide substantially equal heating of the respective layers throughout their thickness to a degree and depth suitable for subsequent hot forging of the seam layers.

It is one of the objects of the present invention to provide a high frequency induction heating apparatus and method adapted to provide a continuous interlock seam of water-tight quality throughout the length of metal tubing.

A further object of the invention is to provide apparatus for continuous welding of tubing by high frequency induction heating, wherein the seam may be of any suitable shape.

Further objects of the invention will become apparent from the following description of a specific example embodying the invention and the attached claims when taken in conjunction with the accompanying drawings illustrating the described specific example embodying the invention and in which:

FIGURE 1 is an isometric view of a high frequency inductor apparatus illustrating a preferred embodiment of the invention;

FIGURE 2 is a sectional view taken on line 2—2 of FIGURE 1, and

FIGURE 3 is a sectional view taken on line 3—3 of FIGURE 2.

Referring now to the drawings wherein a specific example embodying the invention is illustrated for purposes of description and not of limitation, there is provided a spirally wound metal tubing 10 formed by any common method with a spiral interlocking seam 11. The tubing is preferably constructed from commercially available standard pieces of relatively thin uniform wall thickness and of material which is electrically conductive at the frequency with which the inductor, designated generally by reference numeral 12, is energized by source 12a.

The inductor 12 is formed from an electrically conductive material such as copper and has leads 13 and 14 and a longitudinal bottom leg 14a about five inches long. As is common practice, the leg 14a has a stack 15 of iron laminations 16 which are from magnetically permeable material. Each individual lamination 16 is disposed in a plane transverse to the direction of longitudinal movement of the tubing 10 and the lamination stack 15 is spaced approximately ¼ inch from the tubing 10 to provide a coupling which combines both efficiency and allowance for warping of the tubing as it is heated by inductor 12.

Since the tubing 10 is spirally wound, it must be rotated as it passes inductor 12 and the inductor 12 has an arcuate shape so that it matches the path of the advancing seam 11.

The interlocked edges 17 and 18 of the tubing 10 (FIG. 3) are doubled back to form layers 19, 20, 21 and 22 which are locked together by an appropriate apparatus (not shown) positioned in advance of inductor 12. The layers 19–22 are contiguous with their opposed faces lying together. The inductor 12 is used to first heat the layers 19–22 so that they may be welded together by subsequently applied, perpendicular pressure. The tubing 10 may be of any known or desired metallic material; such as, steel, copper, aluminum, stainless steel or the like, and may take any desired shape, although it is shown to be round for purposes of convenience in the figures.

Between the inductor 12 and the upper surface of seam 11 is a refractory body 23 to prevent contact of the seam and inductor spaced only slightly thereabove. The body 23 is formed of magnetic material having high electrical resistivity. In practice this body 23 is comprised of sintered powdered materials so that it not only functions as a spacer but also it serves to concentrate the magnetic flux lines in the seam 11. As shown (FIG. 3) the body 23 is relatively narrow in a circumferential direction relative to the tubing and the lower corners thereof are chamfered to further narrow the edge-facing surface of the member to assist in the flux concentrating function.

Within the tubing 10 is a second body 24 of "Transite" material i.e. an electrically non-conductive material supplied by Johns Manville and having the same function as the body 23. The material is comprised by weight of 15% asbestos fibers and 85% Portland cement bonding the fibers together and is used to maintain the close spacing between the leg 14a of inductor 12 and seam 11.

The effect of the body 23 is to provide a high flux concentration along the seam 11 which concentrates the flux along the seam 11 and in layers 19–22. These currents flowing in a concentrated manner will heat the layers to a forging or welding temperature and the concentration of flux lines lowers the overall heat energy which must be supplied to the inductor 12.

After the layers 19–22 are inductively heated by inductor 12 the tubing 10, i.e. seam 11, passes between a pair of opposed pressure rolls 24, 25 with the roll 24 being spring biased by conventional means (not shown), to effect a perpendicular pressure on the seam to hot forge or weld the layers together whereby the opposed contiguous faces of the layers 19, 20, 21 and 22 are permanently welded together to form a water-tight seal. The pressure rolls are closely spaced behind the inductor so that the seam will not cool below the welding temperature of the metal forming tubing 10. If the metal of the tubing is low carbon steel, this temperature is about 2400° F.

In operation of this apparatus, I have achieved speeds in the order of 50 feet/minute for the tubing 10. In accordance with the invention, the inductor is energized by a power source developing 3,000 cycles per second. With this frequency the depth of penetration of the magnetic flux is sufficient to heat all layers 19, 20, 21 and 22 to a forge welding temperature. The formula used to determine the depth of penetration of the flux is $$d = 3160\sqrt{\frac{p}{uf}}$$

where $p$ equals the resistivity of the metal in ohm-inches, $u$ equals the permeability of the metal (the permeability of non-magnetic material and magnetic heated material above the Curie point is unity so this term can be disregarded without appreciable error) and $f$ equals the frequency in c.p.s.

When the frequency is increased to about 10,000 cycles per second the layer 19 adjacent the inductor 12 tends to be overheated and the layer 22 at the inner surface of the pipe is underheated with the result that the welds are spotty and nonuniform. At the lower frequency of 3,000 cycles per second the heating is deeper and welds appear satisfactory, particularly on the upper two layers 19 and 20. The linear speed of the pipe is maintained at about 50 feet/minute, a speed sufficient to preclude excessive cooling in the interval it takes the heated layers 19, 20, 21 and 22 to reach the hot forging rolls 24, 25 which may or may not serve as drive rolls propelling the welded pipe longitudinally. The mounting of pressure rolls 24, 25 may take various structural embodiments.

I have produced an interlocked seam in the manner described using a 276 kw. power source 12a for the inductor 12 and a frequency of 3,000 cycles per second which is effective to produce a good quality water-tight joint with a 16 gauge sheet metal tubing and ½ inch thick seam 11. A ¼ inch coupling was used between the inductor 12 and the upper layer 19, a spacing consistent with low power loss but still providing for wraping of the seam. The linear speed of tubing 10 is of the order of 50 feet/minute during welding operation, speeds considerably greater than that attainable with arc welding procedures.

The foregoing references to pipe speeds, inductor clearances, etc. in terms of specific values are not limitative of the invention and are only exemplary of preferred operating values for obtaining uniform interlocking seam of water-tight quality.

Prior to the heating of the seams, the tubing can be additionally driven by guide rolls 26, 27 which are located in advance of the inductor 12 and serve to direct the pipe to the correct point of location relatively to the inductor 12. Also, rolls 28, 29 can be used to guide and drive the weld tubing from the rolls 24, 25.

The invention has been particularly described with reference to a preferred embodiment thereof. It will be appreciated that modifications and alterations will occur to others upon a reading and understanding of this specification and it is my intention to include all such modifications insofar as they come within the scope of or are the equivalent of the appended claims.

Having thus described my invention, I claim:

1. A method of producing a spirally formed, metal tubing having a spiral, interlocked seam with at least four separate layers of metal and a thickness $t$, said method comprising the steps of: forming said spiral, interlocked seam in said tubing, advancing the tubing past a high frequency induction heating unit with the previously formed seam passing beneath the unit, maintaining said seam closely spaced from said unit as it passes said unit, powering said unit with an alternating current having a frequency which will result in a reference depth $d$, at least as great as the thickness $t$, of said multi-layer seam wherein said depth is determined by the formula $d = 3160\sqrt{p/f}$, with $p$ being the resistivity of the metal forming the tubing in ohms-inches and $f$ being the frequency of said alternating current in cycles per second, controlling the linear speed of said tubing so that the multi-layer, preformed seam is raised to a temperature at least equal to the welding temperature of the metal forming the layers of the seam and, thereafter, before said seam cools to a temperature less than the welding temperature of said seam metal, pressing said seam together with sufficient force to weld said multi-layer seam.

2. The method as defined in claim 1 wherein said alternating current has a frequency less than 3,000 cycles per second.

3. A method of producing spirally formed, metal tubing having a spiral, interlocked seam with at least four separate layers of metal and a thickness $t$, said method prising the steps of: forming said spiral, interlocked seam in said tubing, advancing the tubing past a high frequency induction heating unit with the previously formed seam passing beneath the unit, maintaining said seam closely spaced from said unit as it passes said unit, powering said unit with an alternating current having a frequency which will result in a reference depth $d$, at least as great as the thickness $t$, of said seam wherein said depth is determined by the formula $d = 3160\sqrt{p/f}$, with $p$ being the resistivity of the metal forming the tubing in ohms-inches and $f$ being the frequency of the alternating current in cycles per second, controlling the linear speed of said tubing so that the multi-layer preformed seam is raised to a temperature at least equal to the welding temperature of the metal forming the layers of the seam and, thereafter, before said seam cools to a temperature less than the welding temperature of said seam metal, passing said seam between pressure rolls which are biased together with a force sufficient to weld said multi-layer seam.

4. An induction welding apparatus for continuously welding the spiral, interlock seam of a spirally wound metal tubing, said seam having a known thickness, said apparatus comprising: means for advancing said tubing with said seam following a predetermined spiral path, a high frequency inductor positioned immediately above said seam, a power supply to energize said inductor with an alternating current having a frequency which will result in a reference depth at least as great as the thickness of said seam, and pressure rolls for pressing said seam together to form a continuous water-tight joint extending spirally around said tubing, said inductor being spirally shaped to match the spiral shape of said interlocked seam.

References Cited by the Examiner

UNITED STATES PATENTS

| | | | |
|---|---|---|---|
| 2,672,544 | 3/1954 | Finckelstein et al. | 219—8.5 |
| 2,818,483 | 12/1957 | Blume | 219—10.41 |
| 2,857,503 | 10/1958 | Rudd et al. | 219—59 |
| 2,873,353 | 2/1959 | Rudd | 219—62 |
| 2,933,582 | 4/1960 | Tower | 219—8.5 |

RICHARD M. WOOD, *Primary Examiner.*